(12) United States Patent
Shi et al.

(10) Patent No.: US 12,151,431 B2
(45) Date of Patent: Nov. 26, 2024

(54) SYSTEM AND METHOD FOR ADDITIVELY PRINTING EXTENSION SEGMENTS ON WORKPIECES

(71) Applicant: General Electric Company, Schenectady, NY (US)

(72) Inventors: Xiaolei Shi, Niskayuna, NY (US); Jinjie Shi, Mason, OH (US); Joseph Edward Hampshire, West Chester, OH (US); Douglas Frank Hofmann, Sonnefeld (DE); Pinghai Yang, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 1 day.

(21) Appl. No.: 18/199,084

(22) Filed: May 18, 2023

(65) Prior Publication Data

US 2023/0302725 A1    Sep. 28, 2023

Related U.S. Application Data

(62) Division of application No. 17/094,892, filed on Nov. 11, 2020, now Pat. No. 11,691,336.

(51) Int. Cl.
*B29C 64/393* (2017.01)
*B29C 64/153* (2017.01)
(Continued)

(52) U.S. Cl.
CPC .......... *B29C 64/153* (2017.08); *B29C 64/209* (2017.08); *B29C 64/245* (2017.08);
(Continued)

(58) Field of Classification Search
CPC ... B29C 64/153; B29C 64/245; B29C 64/209; B29C 64/393; B29C 64/268; B33Y 10/00; B33Y 30/00; B33Y 80/00
See application file for complete search history.

(56) References Cited

U.S. PATENT DOCUMENTS

| 7,761,990 B2 | 7/2010 | Ellis et al. |
| 8,405,659 B2 | 3/2013 | Lakshmanan et al. |
| (Continued) | | |

FOREIGN PATENT DOCUMENTS

| CN | 107175329 A | 9/2017 |
| CN | 110382143 A | 10/2019 |
| (Continued) | | |

OTHER PUBLICATIONS

Chinese Patent Office Action for Application No. 202111353912.3 dated Aug. 25, 2023 (18 pages with English Translation).
(Continued)

*Primary Examiner* — Jamel M Nelson
(74) *Attorney, Agent, or Firm* — Dinsmore & Shohl LLP

(57) ABSTRACT

A method for additively printing extension segments on workpieces using an additive manufacturing machine includes controlling, with a computing system, an operation of a print head of the machine such that a region of interest of a build plate of the machine is scanned with an electromagnetic radiation beam. Additionally, the method includes receiving, with the computing system, data associated with reflections of the beam off of the build plate as the region interest is scanned. Furthermore, the method includes receiving, with the computing system, data associated with a location of the beam relative to the build plate. Moreover, the method includes determining, with the computing system, a location of a workpiece interface based on the received data. In addition, the method includes controlling, with the computing system, the operation of the print head such that an extension segment is additively printed on the determined workpiece interface.

17 Claims, 4 Drawing Sheets

(51) Int. Cl.
  *B29C 64/209*  (2017.01)
  *B29C 64/245*  (2017.01)
  *B29C 64/268*  (2017.01)
  *B33Y 50/02*  (2015.01)
  *B29L 31/08*  (2006.01)
  *B33Y 10/00*  (2015.01)
  *B33Y 30/00*  (2015.01)
  *B33Y 80/00*  (2015.01)

(52) U.S. Cl.
  CPC .......... *B29C 64/268* (2017.08); *B29C 64/393* (2017.08); *B33Y 50/02* (2014.12); *B29L 2031/082* (2013.01); *B33Y 10/00* (2014.12); *B33Y 30/00* (2014.12); *B33Y 80/00* (2014.12)

(56) References Cited

U.S. PATENT DOCUMENTS

| | | |
|---|---|---|
| 9,545,782 B2 | 1/2017 | Shome et al. |
| 9,599,461 B2 | 3/2017 | Gerlach et al. |
| 9,744,719 B2 | 8/2017 | Shome et al. |
| 9,858,728 B2 | 1/2018 | Schmidt |
| 9,902,024 B2 | 2/2018 | Ernst et al. |
| 10,213,964 B2 | 2/2019 | Safai et al. |
| 2014/0163717 A1 | 6/2014 | Das et al. |
| 2015/0336271 A1 | 11/2015 | Spicer et al. |
| 2016/0121438 A1 | 5/2016 | Adewig et al. |
| 2017/0023499 A1 | 1/2017 | Mitchell |
| 2018/0043432 A1 | 2/2018 | Domrose |
| 2018/0143147 A1 | 5/2018 | Milner et al. |
| 2018/0186475 A1 | 7/2018 | Garville |
| 2019/0232371 A1 | 8/2019 | Ladewig et al. |
| 2019/0309733 A1 | 10/2019 | Grishauge et al. |
| 2019/0321916 A1 | 10/2019 | Schwarze et al. |
| 2019/0366491 A1 | 12/2019 | Ozturk et al. |
| 2020/0238380 A1* | 7/2020 | Worthing, Jr. ......... B33Y 80/00 |

FOREIGN PATENT DOCUMENTS

| | | | |
|---|---|---|---|
| CN | 110709247 A | 1/2020 | |
| EP | 3159080 A1 | 4/2017 | |
| EP | 3689506 A1 | 8/2020 | |
| WO | WO-2016183210 A1 * | 11/2016 | .............. B22F 3/105 |

OTHER PUBLICATIONS

Extended European Search Report for EP Application No. 21202839.3 dated Apr. 4, 2022 (8 pages).

* cited by examiner

SYSTEM AND METHOD FOR ADDITIVELY PRINTING EXTENSION SEGMENTS ON WORKPIECES

CROSS-REFERENCE

This application is a divisional of U.S. patent application Ser. No. 17/094,892 filed Nov. 11, 2020, titled SYSTEM AND METHOD FOR ADDITIVELY PRINTING EXTENSION SEGMENTS ON WORKPIECES, the details of which are hereby incorporated herein by reference.

FIELD

The present disclosure generally pertains to systems and methods for additively manufacturing workpieces and, more specifically, to systems and methods for additively printing extension segments on workpieces using an additive manufacturing machine.

BACKGROUND

Turbomachines, such as gas turbine engines, include various components that incur wear during operation. For example, a gas turbine engine typically includes numerous compressor blades and turbine blades, which operate in a high-temperature and high-stress environment. As such, the tips of the blades incur wear from rubbing against shrouds, chemical degradation or oxidation from hot gases, fatigue from cyclic loading and unloading, diffusion creep of crystalline lattices, and so forth. Worn blades may, in turn, degrade the performance of the gas turbine engine.

Since it is typically expensive to replace the compressor and turbine blades of a gas turbine engine with new blades, systems and methods for repairing worn blades have been developed. For example, the worn or damaged tip of a blade may be removed, and a new tip may be additively printed on the blade in its place. While such systems and methods work well, improvements are needed.

Accordingly, an improved system and method for additively printing extension segments on workpieces would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a method for additively printing extension segments on workpieces using an additive manufacturing machine. The method includes controlling, with a computing system, an operation of a print head of the additive manufacturing machine such that a region of interest of a build plate of the additive manufacturing machine is scanned with an electromagnetic radiation beam. The build plate, in turn, includes a workpiece coupled thereto. Additionally, the method includes receiving, with the computing system, data associated with reflections of the electromagnetic radiation beam off of the build plate as the region interest is scanned. Furthermore, the method includes receiving, with the computing system, data associated with a location of the electromagnetic radiation beam relative to the build plate. Moreover, the method includes determining, with the computing system, a location of a workpiece interface of the workpiece based on the received data associated with the reflections of the electromagnetic radiation beam and the received data associated with the location of the electromagnetic radiation beam. In addition, the method includes controlling, with the computing system, the operation of the print head such that an extension segment is additively printed on the determined workpiece interface.

In another aspect, the present subject matter is directed to a system for additively printing extension segments on workpieces. The system includes an additive manufacturing machine having a build plate and a print head. Additionally, the system includes a computing system communicatively coupled to one or more components of the additive manufacturing machine. The computing system, in turn, is configured to control an operation of the print head such that a region of interest of the build plate is scanned with an electromagnetic radiation beam, with the build plate having a workpiece coupled thereto. Furthermore, the computing system is configured to receive data associated with reflections of the electromagnetic radiation beam off of the build plate as the region of interest is scanned. Moreover, the computing system is configured to receive data associated with a location of the electromagnetic radiation beam relative to the build plate. In addition, the computing system is configured to determine a location of a workpiece interface of the workpiece based on the received data associated with the reflections of the electromagnetic radiation beam and the received data associated with the location of the electromagnetic radiation beam. Further, the computing system is configured to control the operation of the print head such that an extension segment is additively printed on the determined workpiece interface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
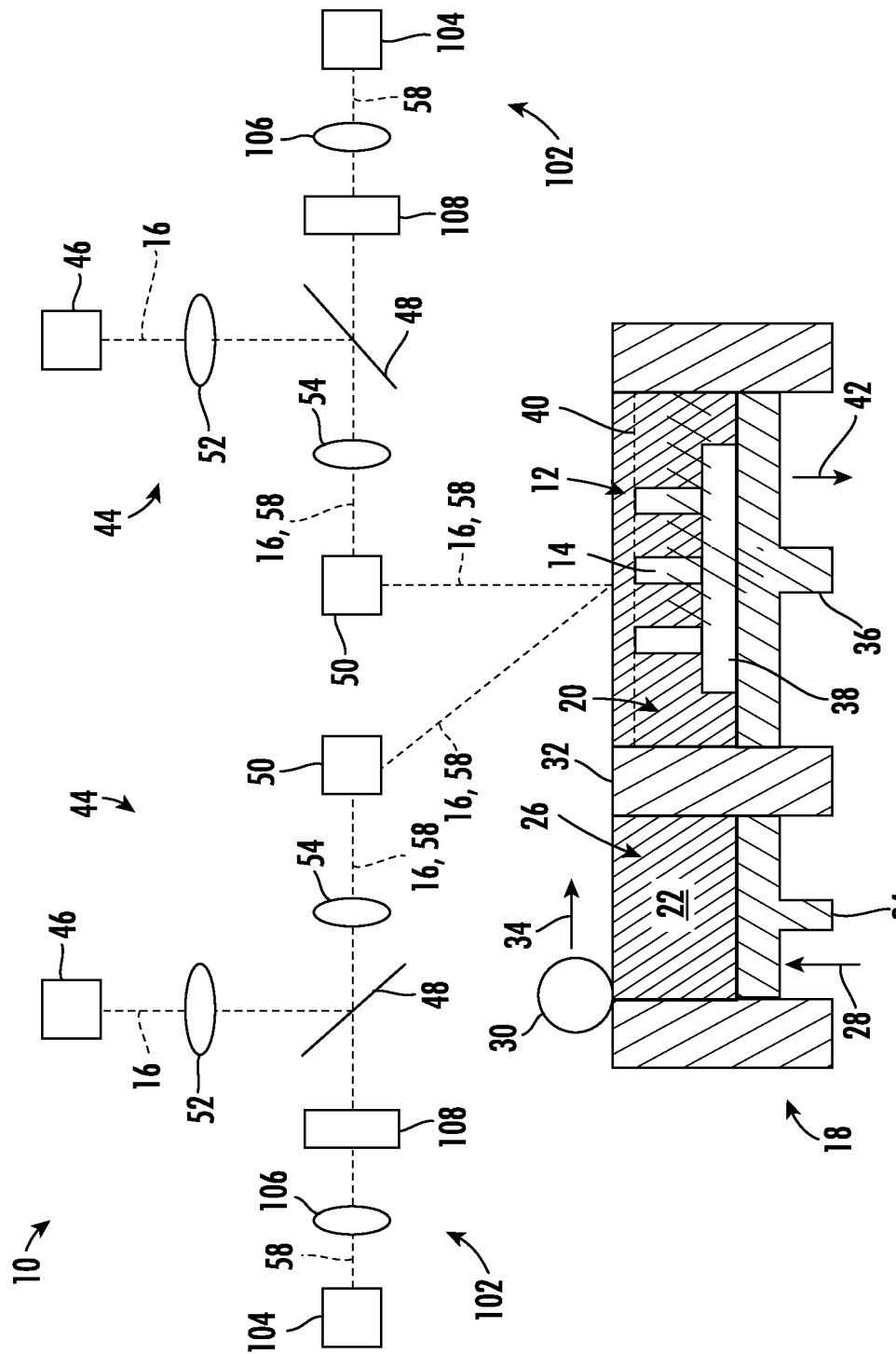
FIG. 1 is a side view of one embodiment of an additive manufacturing machine.

Repeat use of reference characters in the present specification and drawings is intended to represent the same or analogous features or elements of the present invention.

DETAILED DESCRIPTION

Reference now will be made in detail to exemplary embodiments of the presently disclosed subject matter, one or more examples of which are illustrated in the drawings.

Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced items.

In general, the present subject matter is directed to a system and method for additively printing extension segments on workpieces. More specifically, in the disclosed method, a worn or damaged portion(s) of a workpiece is removed and an extension segment(s) is additively printed in place of the removed portion(s) using an additive manufacturing machine. For example, as described above, the tip of a gas turbine engine blade may become worn or damaged during operation of the engine. As such, in accordance with aspects of the present subject matter, the tip of the blade may be removed (e.g., cut off) and a new tip may be additively printed in its place.

In several embodiments, the additive manufacturing machine includes a build plate, a print head, and a detection module. More specifically, the workpiece is coupled to or otherwise positioned on the build plate after the worn/damaged portion(s) is removed. Furthermore, the print head may include a beam emitter that emits an electromagnetic radiation beam (e.g., a laser beam), a focusing lens that focuses the emitted beam, and a galvanometer that directs the emitted and focused beam onto the build plate. Additionally, the detection module includes an imaging device (e.g., a photodiode) that receives the reflections of the electromagnetic radiation beam off of the build plate as the beam is scanned across the build plate.

The print head is used to scan a workpiece interface of the work piece on which the extension segment will be printed and additively print the extension segment. Specifically, a computing system is configured to control the operation of the print head such that a region of interest of the build plate (e.g., the region where the workpiece is located) is scanned with the electromagnetic radiation beam. As the region of interest is scanned, the computing system is configured to receive data associated with the reflections of the beam from the imaging device and data associated with the location of the beam relative to the build plate from the galvanometer. Moreover, the computing system is configured to determine the location of the workpiece interface based on the received data from the imaging device and the received data from the galvanometer. For example, in some embodiments, the computing system generates an image of region of interest based on the received data, with the generated image illustrating the differences in the signal strength/level of the beam reflections. In such embodiments, the computing system then determines the location of the workpiece interface based on the depicted signal strength/level differences. Thereafter, the computing system is configured to control the operation of the print head such that the extension segment is additively printed on the workpiece interface.

Using the print head to scan the workpiece interface and additively print the extension segment provides one or more technical advantages. Specifically, conventional systems and methods of additively printing extension segments determine the location of the workpiece interface using a measuring system that is separate from the additive manufacturing machine. Thereafter, the workpiece is moved from the measuring system and placed in the additive manufacturing machine for printing. However, it is difficult to locate the workpiece within the additive manufacturing machine exactly as it was located within the measuring system. When not properly positioned within the additive manufacturing machine, the position of the workpiece interface as determined by the measuring system is offset from the actual position of the workpiece interface. As such, the extension segment(s) may be misaligned relative to the remainder of the workpiece, resulting in extensive rework to or scrapping of the workpiece. By using the print head to scan the workpiece interface and additively print the extension segment, the location of the workpiece interface within the additive manufacturing machine relative to the print head always corresponds to the determined/scanned location of the workpiece interface as because the workpiece does not move relative to the additive manufacturing machine between scanning and printing.

Referring now to the drawings, FIG. 1 is a side view of one embodiment of an additive manufacturing machine 10. As will be described below, the additive manufacturing machine 10 is used to scan a workpiece interface(s) 12 of one or more workpieces 14 positioned within the machine 10 with one or more electromagnetic radiation beams 16 (e.g., a laser beam(s)). Moreover, the additive manufacturing machine 10 is used to additively print (i.e., using an additive manufacturing technique(s)) one or more extension segments on each scanned workpiece 12.

As used herein, the terms "additively manufacturing" or "additive manufacturing techniques or processes" refer to manufacturing processes in which successive layers of material are deposited on top of each other to build-up, layer-by-layer, a three-dimensional component. The successive layers are melted or fused together to form a monolithic or integral component.

In several embodiments, the additive manufacturing machine 10 uses a powder bed fusion (PBF) technique, as direct metal laser melting (DMLM) or directed metal laser sintering (DMLS). In such embodiments, the extension segment(s) are additively printed on the workpiece(s) 14 by melting or fusing a first layer of powder to the workpiece interface(s) 12, melting or fusing a second layer of powder on top of the first layer, and so on. However, in some embodiments, extension segment(s) may be additively printed by melting or fusing a single layer of powder to the workpiece interface(s) 12. Furthermore, in alternative embodiments, the additive manufacturing machine 10 may use any other suitable additive manufacturing techniques or processes.

Additionally, the workpiece(s) 14 may correspond to any suitable component(s) having a surface or other interface on which the extension segment(s) can be additively printed. For example, in the illustrated embodiment, the workpiece(s) 14 correspond to a blade(s) of a turbomachine (e.g., a gas turbine engine), such as a compressor blade or a turbine blade. As described above, the tip(s) of the blade(s) may become worn or damaged during operation of the gas turbine engine. In such an embodiment, the tip(s) may be removed (e.g., via cutting, machine, grinding, etc.) from the remainder of the blade(s), leaving a surface(s) or an interface(s) on which new tip(s) can be additively printed. However, in alternative embodiments, the workpiece(s) 14 may correspond to any suitable component(s), such as other component(s) of a turbomachine (e.g., a shroud block(s), a fuel nozzle(s), etc.) or component(s) of any other machine.

As shown, the additive manufacturing machine 10 includes a powder supply assembly 18 and a build chamber 20. In general, the powder supply assembly 18 provides a supply of powder 22 to the build chamber 20 for use in additively printing the extension segment(s) on the workpiece(s) 14. Specifically, in several embodiments, the powder supply assembly 18 includes a powder piston 24 positioned within a powder supply chamber 26 containing the powder 22. In this respect, the powder piston 24 may be raised (e.g., as indicated by arrow 28) within the powder supply chamber 26, thereby forcing a portion of the powder 22 out of the powder supply chamber 26. Moreover, the powder supply assembly 18 includes a recoater 30, such as a roller or a blade/wiper, that pushes the powder 22 expelled from the powder supply chamber 26 across a work surface 32 and into the build chamber 20 (e.g., as indicated by arrow 34).

Moreover, the additive manufacturing machine 10 includes a build platform 36 and a build plate 38 positioned within the build chamber 20. More specifically, as shown, the build plate 38 is positioned on the build platform 36 and secured thereto via a suitable chuck system (not shown). The workpiece(s) 14 is, in turn, coupled to or otherwise positioned on the build plate 38 such that the extension segment(s) can be additively printed thereon. During printing of the extension segment(s), the recoater 30 fills the build chamber 20 with the powder 22 until the powder 22 forms a build plane (indicated by dashed line 40) at the same vertical position as the workpiece interface(s) 12. Next, the recoater 30 spreads a layer of the powder 22 across the build plane 40. The layer of powder 22 is then melted or fused to the workpiece interface(s) 12 using the electromagnetic radiation beam(s) 16 to form a first layer(s) of the extension segment(s). Thereafter, the build platform 36 is lowered (e.g., as indicated by arrow 42) before the recoater 30 spreads another layer of the powder 22 across the build plane 40. This layer may then be melted or fused to the first layer(s) using the radiation beam(s) 16 to form a second layer(s) of the extension segment(s) and so on.

Additionally, the additive manufacturing machine 10 includes one or more print heads 44. In general, the print head(s) 44 generate and direct the electromagnetic radiation beam(s) 16 at the build plane 40, thereby allowing the powder 22 spread across the build plane 40 to be melted/fused. As shown, in several embodiments, each print head 44 includes a beam emitter 46 (e.g., a laser diode), a mirror 48, and a galvanometer 50. More specifically, the beam emitter 46 emits an electromagnetic radiation beam 16 (e.g., a laser beam) at the mirror 48. The mirror 48, in turn, directs the emitted beam 16 at the galvanometer 50, and the galvanometer 50 directs the beam 16 at a specific location on the build plane 40. In this respect, when additively printing the extension segment(s), the galvanometer 50 scans the beam 16 over the portion of the build plane 40 at which it desired to melt or fuse the powder 22 to form a layer(s) of the extension segment(s). Moreover, in one embodiment, each print head 44 may include a first lens 52 positioned between the beam emitter 46 and the mirror 48 to collimate the emitted beam 16 and a second or focusing lens 54 positioned between the mirror 48 and the galvanometer 50 to focus the beam 16. However, in alternative embodiments, the print head(s) 44 may have any other suitable configuration.

The additive manufacturing machine 10 may include any suitable number of print heads 44. For example, in the illustrated embodiment, the additive manufacturing machine 10 includes two print heads 44. However, in alternative embodiments, the additive manufacturing machine 10 may include a single print head 44 or three or more print heads 44.

Furthermore, the additive manufacturing machine 10 includes one or more detection modules 102. Each detection module 102 is, in turn, operatively associated with one of the print heads 44. More specifically, as described above, during operation of the additive manufacturing machine 10, the galvanometer(s) 50 scans the electromagnetic radiation beam(s) 16 across the build plane 40. The beam(s) 16 then reflect or scatter off of the build plane 40 (i.e., either off of the powder 22 or the workpiece interface(s) 12) as reflections 58. In this respect, each detection module 102 includes an imaging device 104, such as photodiode or a camera, that receives the reflections 58 of the beam 16 emitted by the associated print head 44. For example, in the illustrated embodiment, the reflections 58 are directed by the galvanometer(s) 50 and the mirror(s) 48 to the imaging device(s) 104. Additionally, in one embodiment, each detection module 102 may include a lens 106 and/or a filter 108 positioned between the corresponding mirror 48 and the corresponding imaging device 104. However, in alternative embodiments, the detection module(s) 102 may have any other suitable configuration.

The configuration of the additive manufacturing machine 10 described above and shown in FIG. 1 is provided only to place the present subject matter in an exemplary field of use. Thus, the present subject matter may be readily adaptable to any manner of additive manufacturing machine, including additive manufacturing machines that use different additive manufacturing techniques.

Figure 2:
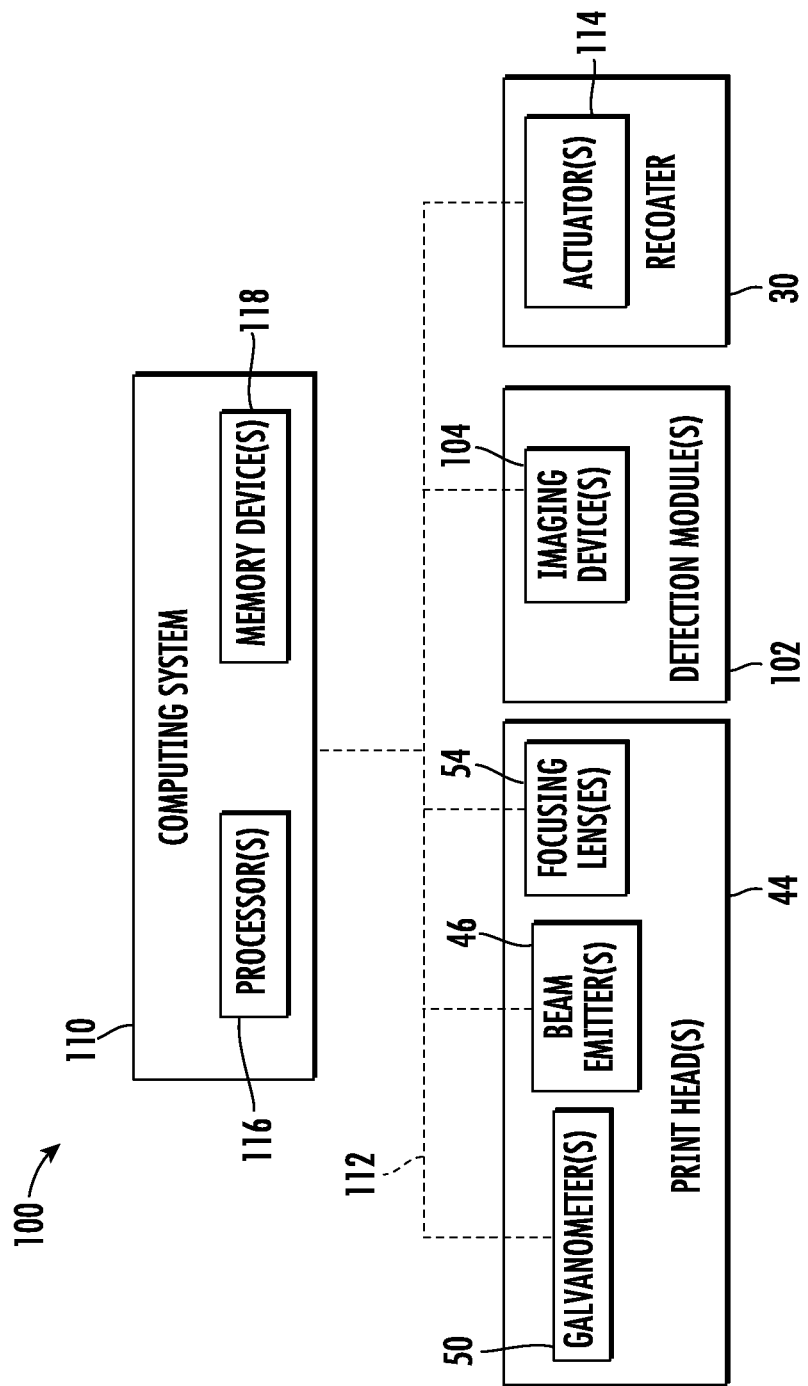
FIG. 2 is a schematic view of one embodiment of a system for additively printing extension segments on workpieces.

FIG. 2 is a schematic view of one embodiment of a system 100 for system for additively printing extension segments on workpieces. In general, the system 100 will be discussed in the context of the additive manufacturing machine 10 described above and shown in FIG. 1. However, the disclosed system 100 may be implemented with any additive manufacturing machine having any other suitable configuration.

As shown in FIG. 2, the system 100 may include a computing system 110 communicatively coupled to one or more components of the additive manufacturing machine 10 to allow the computing system 110 to electronically or automatically control the operation of such components. For instance, the computing system 110 may be communicatively coupled to the beam emitter(s) 46, the focusing lens(es) 54, and the galvanometer(s) 50 of the print head(s) 44 via a communicative link 112. As such, the computing system 110 may be configured to control the operation of the beam emitter(s) 46, the focusing lens(es) 54, and the galvanometer(s) 50 such that an electromagnetic radiation beam(s) 16 is generated, focused, and scanned across the build plane 40. The computing system 110 also receives data associated with the location(s) of the beam(s) 16 relative to the build plate 38 from the galvanometer(s) 50 as the beam(s) 16 are scanned across the build plane 40. Moreover, the computing system 110 may be communicatively coupled to the imaging device(s) 104 of the detection module(s) 102 via the communicative link 112. In this respect, the computing system 110 may be configured to receive data associated with the reflections 58 of the electromagnetic radiation beam(s) 16 off of the build plane 40. Furthermore, the computing system 110 may be communicatively coupled to an actuator(s) 114 (e.g., a solenoid(s) or an electric motor(s)) of the recoater 30 via the communicative link 112. Thus, the computing system 110 may be configured to control the operation of the recoater 30 such that the powder 22 is transferred from the powder supply chamber 26 to the build chamber 20. Additionally, the computing system 110 may be communicatively coupled to any other suitable components of the additive manufacturing machine 10 via the communicative link 112.

In general, the computing system 110 may comprise one or more processor-based devices, such as a given controller or computing device or any suitable combination of controllers or computing devices. Thus, in several embodiments, the computing system 110 may include one or more processor(s) 116 and associated memory device(s) 118 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 118 of the computing system 110 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 118 may generally be configured to store suitable computer-readable instructions that, when implemented by the processor(s) 116, configure the computing system 110 to perform various computer-implemented functions, such as one or more aspects of the methods and algorithms that will be described herein. In addition, the computing system 110 may also include various other suitable components, such as a communications circuit or module, one or more input/output channels, a data/control bus and/or the like.

The various functions of the computing system 110 may be performed by a single processor-based device or may be distributed across any number of processor-based devices. In such instances, such processor-based devices may form part of the computing system 110. For instance, the functions of the computing system 110 may be distributed across multiple application-specific controllers, such an additive manufacturing device controller, a controller(s)/computing device(s) of a remote device(s) (e.g., a laptop, a desktop, a server, etc.), and/or the like.

Figure 3:
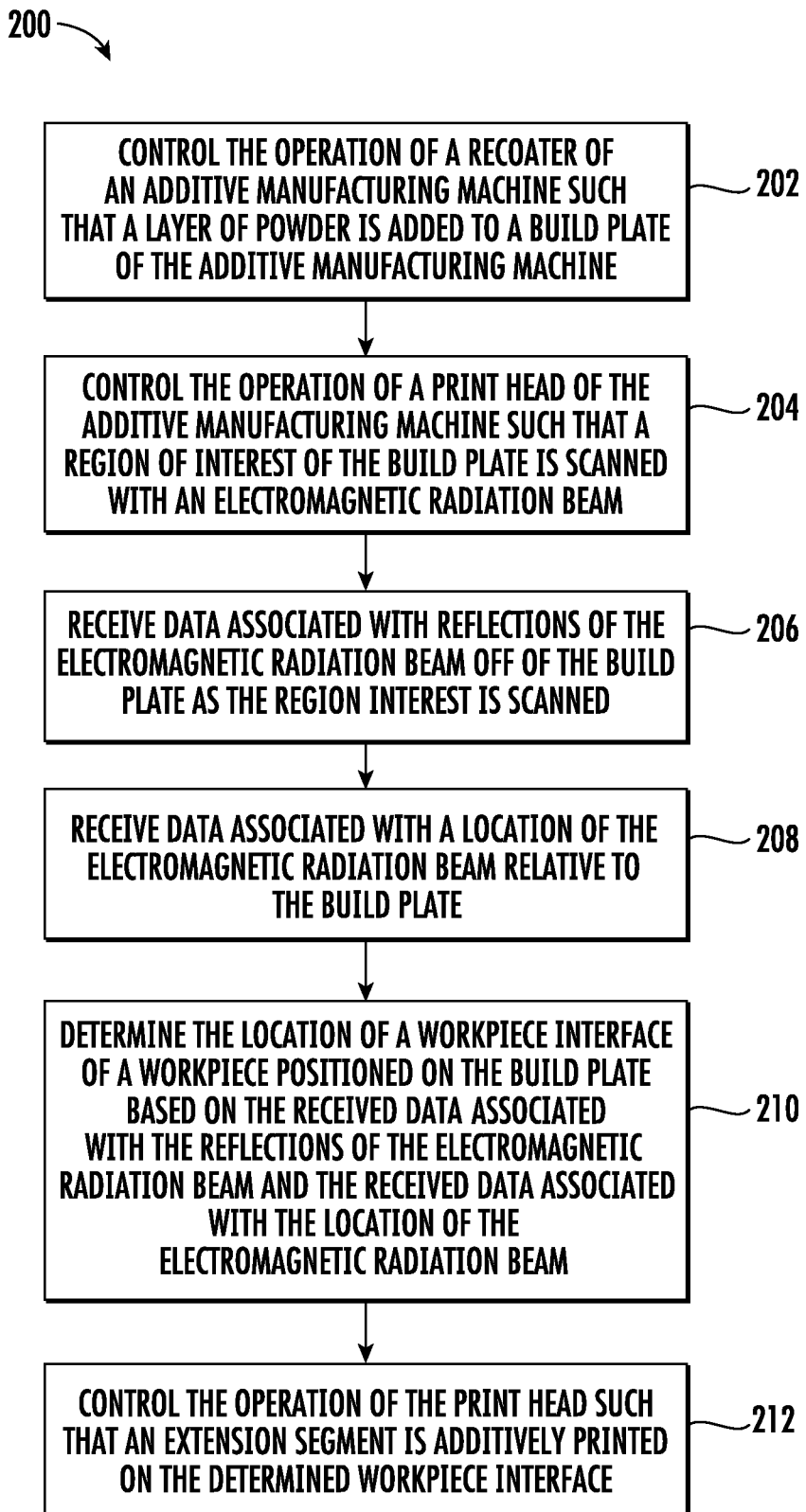
FIG. 3 is a flow diagram of one embodiment of a method for additively printing extension segments on workpieces.

FIG. 3 is a flow diagram of one embodiment of a method 200 for additively printing extension segments on workpieces. In general, the method 200 will be discussed in the context of the additive manufacturing machine 10 and the system 100 described above and shown in FIGS. 1 and 2. However, the disclosed method 200 may be implemented with any additive manufacturing machine having any suitable configuration and/or within any system having any suitable configuration. In addition, although FIG. 3 depicts steps performed in a particular order, the disclosed methods are not limited to any particular order or arrangement. As such, the various steps of the disclosed methods can be omitted, rearranged, combined, and/or adapted in various ways without deviating from the scope of the present disclosure.

As shown, at (202), the method 200 may include controlling, with a computing system, the operation of a recoater of an additive manufacturing machine such that a layer of powder is added to a build plate of the additive manufacturing machine. More specifically, one or more workpieces 14 (e.g. a turbomachine blade(s)) are coupled to or otherwise positioned on a build plate 38. The build plate 38 is, in turn, coupled to a build platform 36 (e.g., via a chuck system) positioned within a build chamber 20 of an additive manufacturing machine 10. Thereafter, the computing system 110 may be configured to control the operation of a recoater 30 such that powder 22 is spread across the build plate 38. For example, in one embodiment, the computing system 110 is configured to transmit control signals to the actuator(s) 114 of the recoater 30 via the communicative link 112. The control signals, in turn, instruct the actuator(s) 114 to move the recoater 30 (e.g., as indicated by the arrow 34 in FIG. 1) such that a layer of the powder 22 is spread across the build plate 38. As will be described below, the layer of the powder 22 may help the computing system 110 determine the location of the workpiece interface(s) 12 on which the extension segment(s) will be additively printed.

At (202), any suitable thickness of powder 22 may be spread across the build plate 38. In general, each time the recoater 30 moves in the direction 34, a thin layer of powder is spread across the build plate 38. In some embodiments, it may be desired to spread only a single layer of the powder 22 across the build plate 38. In such embodiments, the computing system 110 may control the actuator(s) 114 such that the recoater 30 makes a single pass across the work surface 32. However, in other embodiments, it may be desired to provide a thicker layer of powder 22 across the build plate 38. In such embodiments, the computing system 110 may control the actuator(s) 114 such that the recoater 30 makes multiple passes across the work surface 32. For example, in one embodiment, the recoater 30 may fill the build chamber 20 with the powder 22 such that the powder 22 reaches the build plane 40. However, in alternative embodiments, any suitable thickness of powder 22 may be spread across the build plate 38 so long as the entire build plate 38 is covered with the powder 22, but the workpiece interface(s) 12 is not covered with the powder 22.

Furthermore, at (204), the method 200 includes controlling, with the computing system, the operation of a print head of the additive manufacturing machine such that a region of interest of the build plate is scanned with an electromagnetic radiation beam. Specifically, in several embodiments, the computing system 110 is configured to control the operation of the print head(s) 44 such that one or more regions of interest of the build plate 38 are scanned with an electromagnetic radiation beam(s) 16. For example, the computing system 110 may be configured to transmit control signals to the beam emitter(s) 46, the focusing lens(es) 54, and the galvanometer(s) 50 of the print head(s) 44 via the communicative link 112. The control signals, in turn, instruct the beam emitter(s) 46 to emit the electromagnetic radiation beam(s) 16, the focusing lens(es) 54 to focus the emitted beam(s) 16, and the galvanometer(s) 50 to scan the emitted and focused beam(s) 16 across the region(s) of interest. As will be described below, such scanning of the region(s) of interest allows the computing system 110 to determine the location(s) of the workpiece interface(s) 12 on which the extension segment(s) will be additively printed. Additionally, the energy of the emitted beam(s) 16 is less when scanning the region of interest(s) than when additively printing the extension segment(s).

Moreover, as shown, at (206), the method 200 includes receiving, with the computing system, data associated with reflections of the electromagnetic radiation beam off of the build plate as the region of interest is scanned. In general, the additive manufacturing machine 10 includes a detection module 102 operatively associated with each print head 44. In this respect, as the region(s) of interest is scanned by the electromagnetic radiation beam(s) 16, the powder 22 and the workpiece interface(s) 12 reflect the beam(s) 16 as reflections 58. These reflections 58 are then directed by the galvanometer(s) 50 and the mirror(s) 48 onto the imaging device(s) 104 of the detection module(s) 102. The imaging device(s) 104, in turn, convert the detected reflections 58 into data and transmit such data to computing system 110 via the communicative link 112. Moreover, the computing system 110 also receives data from the galvanometer(s) 50 indicative of the location on the build plane 40 at which the emitted beam(s) 16 are directed.

Additionally, as shown, at (208), the method 200 includes receiving, with the computing system, data associated with the location of the electromagnetic radiation beam relative to the build plate. In this respect, as the region(s) of interest is scanned by the electromagnetic radiation beam(s) 16, the galvanometer(s) 50 transmits data to computing system 110 via the communicative link 112. Such data is, in turn, indicative of the location (e.g., the location in the horizontal or X-Y plane) on the build plate 38 at which the emitted beam(s) 16 is currently directed.

In several embodiments, the data received from the imaging device(s) 104 is synchronized or otherwise correlated with the data received from the galvanometer(s) 50. As such, the synchronized data may include a plurality of data points, with each data point being indicative of the signal level or strength of the reflection 58 at a specific location within a region of interest on the build plate 38. That is, each synchronized data point includes a signal level/strength component based on the data received from the corresponding imaging device 104 and an associated location component based on the data received from the corresponding galvanometer 50. The signal level/strength of each synchronized data point is, in turn, indicative of what the beam 16 was reflected off of (i.e., the powder 22 or the workpiece interface(s) 12) at the corresponding location. For example, data points corresponding to the powder 22 may have a first signal level/strength and data points corresponding to the workpiece interface(s) 12 may have a different second signal level/strength. However, in alternative embodiments, the data received by the computing system 100 may be indicative of any other suitable parameter associated with the detected reflections 58.

Furthermore, in several embodiments, the computing system 110 may be configured to adjust the resolution of the captured data. For example, the computing system 110 may adjust the operation of the galvanometer(s) 50 to vary the speed at which the emitted beam(s) 116 scan the region(s) of interest, thereby changing the resolution of the data. Additionally, or as an alternative, the computing system 110 may adjust the operation of the imaging device(s) 104 to vary its sampling rate as the emitted beam(s) 116 scan the region(s) of interest, thereby changing the resolution of the data.

Figure 4:
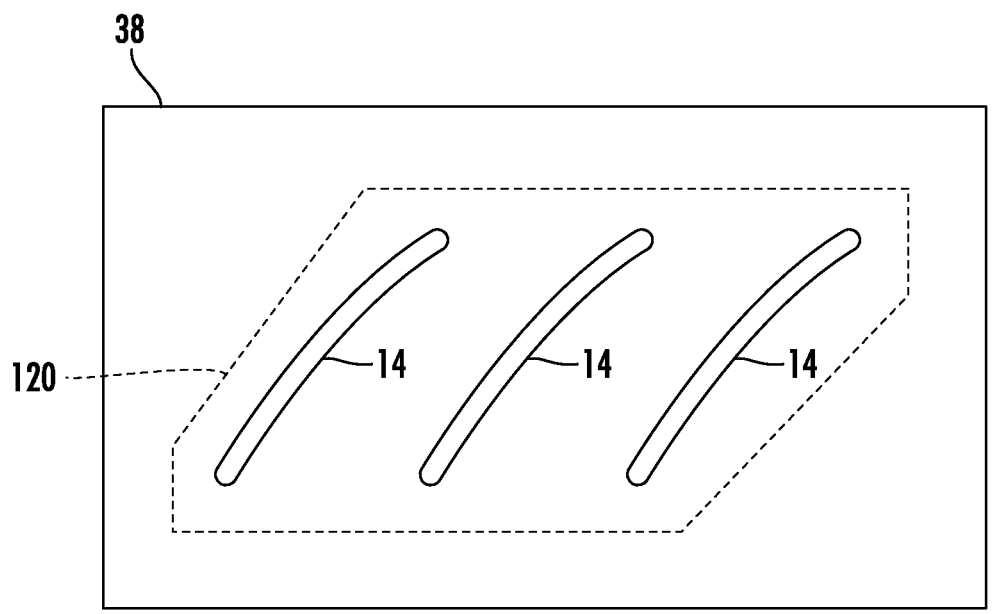
FIG. 4 is a top view of one embodiment of a build plate of an additive manufacturing machine, particularly illustrating the build plate having a single region of interest.

As mentioned above, in some embodiments, the additive manufacturing machine 10 includes only a single print head 44 and associated detection module 102. In such embodiments, a single electromagnetic radiation beam 16 emitted by the print head 44 scans all of the regions of interest on the build plate 38. For example, in one embodiment, the build plate 38 includes a single region of interest corresponding to the entirety of the build plate 38. In another embodiment, as shown in FIG. 4, the build plate 38 includes a single region of interest (indicated by dashed lines 120) corresponding to the portion of the build plate 38 in which the workpiece(s) 14 are positioned. In a further embodiment, the build plate 38 includes a plurality of regions of interest, with each region of interest corresponding to a portion of the build plate 38 in which one or more workpiece(s) 14 are present (e.g., a region of interest may be positioned around each workpiece 14).

Figure 5:
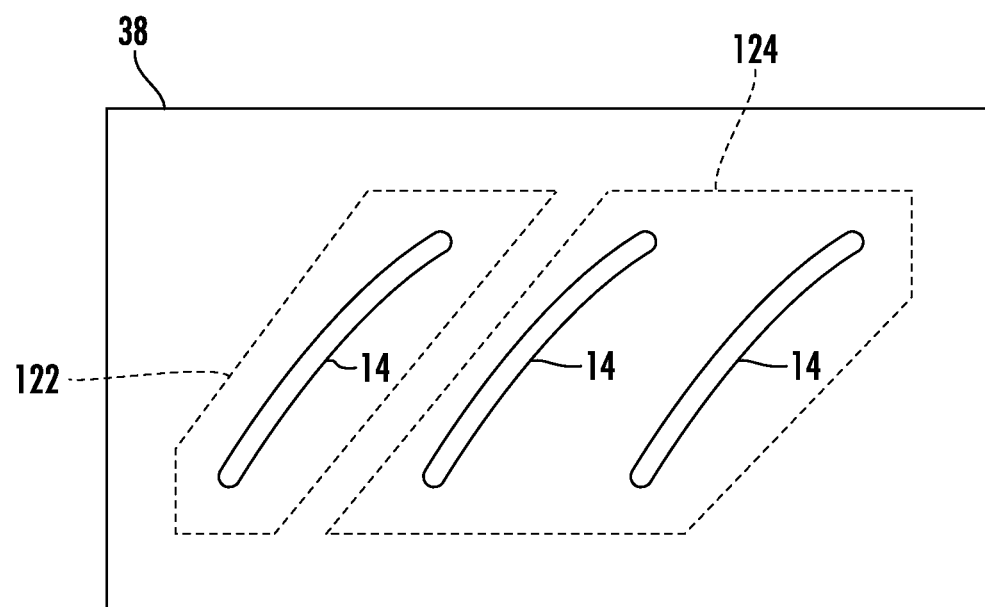
FIG. 5 is a top view of another embodiment of a build plate of an additive manufacturing machine, particularly illustrating the build plate having first and second regions of interest.

Moreover, as mentioned above, in some embodiments, the additive manufacturing machine 10 includes two print heads 44 and associated detection modules 102. For example, as shown in FIG. 5, in one embodiment, the build plate 38 includes a first region of interest (indicated by dashed lines 122) corresponding to a portion of the build plate 38 in which one or more workpieces 14 are positioned and a second region of interest (indicated by dashed lines 124) corresponding to another portion of the build plate 38 in which one or more other workpieces 14 are positioned. In such an embodiment, a first beam 16 emitted by a first print head 44 scans the first region of interest 122 and second beam 16 emitted by a second print head 44 scans the second region of interest 124.

Additionally, in another embodiment in which the additive manufacturing machine 10 includes two print heads 44 and associated detection modules 102, the region(s) of interest is scanned simultaneously by the first and second beams 16. More specifically, in such an embodiment, both print heads 44 are controlled such that the first and second beams 16 are simultaneously directed at the same location on the build plate 38 as the beams 16 scan the build plate 38. The reflections 58 from the first beam 16 emitted by the first print head 44 are detected by an imaging device 104 of a first detection module 102 associated with the first print head 44. Similarly, the reflections 58 from the second beam 16 emitted by the second print head 44 are detected by an imaging device 104 of a second detection module 102 associated with the second print head 44. The computing system 110 then uses the data from the imaging device 104 that detects the reflections 58 from the most favorable position (e.g., beam angle).

Furthermore, as shown in FIG. 3, at (210), the method 200 includes determining, with the computing system, the location of a workpiece interface of a workpiece positioned on the build plate based on the received data associated with the reflections of the electromagnetic radiation beam and the received data associated with the location of the electromagnetic radiation beam. Specifically, in several embodiments, the computing system 110 may be configured to generate an image of each region of interest based on the data received from the print head(s) 44 (i.e., the galvanometer(s) 50) and the detection module(s) 102 (i.e., the imaging device(s) 104). As described above, the computing device 110 synchronizes the received data such that each synchronized data point has a signal level/strength component based on the data received from the imaging device(s) 104 and an associated location component based on the data received from the galvanometer(s) 50. For example, in one embodiment, each generated image includes a plurality of pixels, with each pixel corresponding to a captured and synchronized sample of the received data. In such an embodiment, the location of each pixel corresponds to an actual location (e.g., the location in a horizontal plane) on the build plate 38 from which data indicative of a reflection/scattering of an emitted beam 16 was captured. Thus, the intensity value of each pixel is indicative of whether powder 22 or a workpiece interface 12 is present at that location. That is, the intensity value of each pixel is indicative of the signal level/strength of the reflections 58 occurring at that location. Thereafter, the computing system 110 may be configured to use any suitable image processing techniques, such as an edge-finding technique, to identify the location of the workpiece interface(s) 12 within the generated image(s).

In addition, at (212), the method 200 includes controlling, with the computing system, the operation of the print head such that an extension segment is additively printed on the determined workpiece interface. More specifically, after determining the location(s) of the workpiece interface(s) 12 on which the extension segment(s) will be printed, the computing system 110 may create a build file/model for the extension segment(s). For example, as part of creating the build file/model, the computing system 110 may modify 14 (e.g., by rotating, twisting, and/or translating) a computer-aided design (CAD) model of the workpiece(s) 14 such that the workpiece interface(s) 12 of the CAD model corresponds to the workpiece interface(s) 12 as determined at (210). Thereafter, the computing system 110 may be configured to control the operation of beam emitter(s) 46 and the galvanometer(s) 50 of the print head(s) 44 such that the extension segment(s) is additively printed on the workpiece interface(s) 12 of the workpiece(s) 14. During such additive printing, the energy of the electromagnetic radiation beam(s) 16 emitted by the print head(s) 44 is greater than the when scanning the region(s) of interest at (204). The scan speed of galvanometer(s) 50 during the additive printing at (210) may be different from when scanning the region(s) of interest at (204).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A method for additively printing extension segments on workpieces using an additive manufacturing machine, the method comprising: controlling, with a computing system, an operation of a print head of the additive manufacturing machine such that a region of interest of a build plate of the additive manufacturing machine is scanned with an electromagnetic radiation beam, the build plate including a workpiece coupled thereto; receiving, with the computing system, data associated with reflections of the electromagnetic radiation beam off of the build plate as the region interest is scanned; receiving, with the computing system, data associated with a location of the electromagnetic radiation beam relative to the build plate; determining, with the computing system, a location of a workpiece interface of the workpiece based on the received data associated with the reflections of the electromagnetic radiation beam and the received data associated with the location of the electromagnetic radiation beam; and controlling, with the computing system, the operation of the print head such that an extension segment is additively printed on the determined workpiece interface.

The method of one or more of these clauses, wherein receiving data associated with the reflections of the electromagnetic radiation beam comprises receiving, with the computing system, data indicative of a signal strength of the reflections of the electromagnetic radiation beam off of the build plate.

The method of one or more of these clauses, wherein determining the location of the workpiece interface comprises generating, with the computing system, an image of the build plate based on the received data associated with the reflections of the electromagnetic radiation beam and the received data associated with the location of the electromagnetic radiation beam, the image including a plurality of pixels, each pixel corresponding to one sample of the received data.

The method of one or more of these clauses, wherein determining the location of the workpiece interface comprises analyzing, with the computing system, the generated image to determine the location of the workpiece interface.

The method of one or more of these clauses, further comprising: controlling, with the computing system, an operation of a recoater of the additive manufacturing machine such that a layer of powder is added to the build plate before scanning the region of interest with the electromagnetic radiation beam.

The method of one or more of these clauses, wherein the region of interest corresponds to a portion of the build plate.

The method of one or more of these clauses, wherein the region of interest corresponds to an entirety of the build plate.

The method of one or more of these clauses, wherein controlling the operation of the print head such that the region of interest is scanned comprises: controlling, with the computing system, the operation of a first print head of the additive manufacturing machine such that a first region of interest of the build plate is scanned with a first electromagnetic radiation beam; and controlling, with the computing system, the operation of a second print head of the additive manufacturing machine such that a second region of interest of the build plate is scanned with a second electromagnetic radiation beam.

The method of one or more of these clauses, wherein controlling the operation of the print head such that the region of interest is scanned comprises controlling, with the computing system, the operation of first and second print heads of the additive manufacturing machine such that the region of interest of the build plate is scanned with first and second electromagnetic radiation beams.

The method of one or more of these clauses, wherein controlling the operation of the print head such that the region of interest is scanned comprises adjusting at least one of a scan speed of a galvanometer of the additive manufacturing machine or a sampling rate of an imaging device of the additive manufacturing machine.

The method of one or more of these clauses, wherein an energy of the electromagnetic radiation beam is less when the region of interest of the build plate is scanned than when the extension segment is additively printed on the determined workpiece interface.

The method of one or more of these clauses, wherein the workpiece comprises a compressor blade or a turbine blade of a turbomachine.

A system for additively printing extension segments on workpieces, the system comprising: an additive manufacturing machine including a build plate and a print head; and a computing system communicatively coupled to one or more components of the additive manufacturing machine, the computing system configured to: control an operation of the print head such that a region of interest of the build plate is scanned with an electromagnetic radiation beam, the build plate having a workpiece coupled thereto; receive data associated with reflections of the electromagnetic radiation beam off of the build plate as the region of interest is scanned; receive data associated with a location of the electromagnetic radiation beam relative to the build plate; determine a location of a workpiece interface of the workpiece based on the received data associated with the reflections of the electromagnetic radiation beam and the received data associated with the location of the electromagnetic radiation beam; and control the operation of the print head such that an extension segment is additively printed on the determined workpiece interface.

The system of one or more of these clauses, wherein, when receiving data associated with reflections of the electromagnetic radiation beam, the computing system is configured to receive data indicative of a signal strength of the reflections of the electromagnetic radiation beam off of the build plate.

The system of one or more of these clauses, wherein, when determining the location of the workpiece interface, the computing system is further configured to: generate an image of the build plate based on the received data associated with the reflections of the electromagnetic radiation beam and the received data associated with the location of the electromagnetic radiation beam, the image including a plurality of pixels, each pixel corresponding to one sample of the received data; and analyze the generated image to determine the location of the workpiece interface.

The system of one or more of these clauses, wherein the additive manufacturing machine further includes a recoater, the computing system further configured to: control an operation of the recoater such that a layer of powder is added to the build plate before the region of interest is scanned with the electromagnetic radiation beam.

The system of one or more of these clauses, wherein the region of interest corresponds to a portion of the build plate.

The system of one or more of these clauses, wherein the region of interest corresponds to an entirety of the build plate.

The system of one or more of these clauses, wherein, when controlling the operation of the print head such that the region of interest is scanned, the computing system is further configured to: control the operation of a first print head of the additive manufacturing machine such that a first region of interest of the build plate is scanned with a first electromagnetic radiation beam; and control the operation of a second print head of the additive manufacturing machine such that a second region of interest of the build plate is scanned with a second electromagnetic radiation beam.

The system of one or more of these clauses, wherein, when controlling the operation of the print head such that the region of interest is scanned, the computing system is further configured to control the operation of first and second print heads of the additive manufacturing machine such that the region of interest of the build plate is scanned with first and second electromagnetic radiation beams.

What is claimed is:

1. A system for additively printing extension segments on a workpiece, the system comprising:
an additive manufacturing machine including a build plate and a print head; and
a computing system communicatively coupled to one or more components of the additive manufacturing machine, the computing system configured to:
control an operation of the print head such that a region of interest of the build plate is scanned with an electromagnetic radiation beam, the build plate having the workpiece coupled thereto;
receive data associated with reflections of the electromagnetic radiation beam off of the build plate as the region of interest is scanned;
receive data associated with a location of the electromagnetic radiation beam relative to the build plate;
determine a location of a workpiece interface of the workpiece based on the received data associated with the reflections of the electromagnetic radiation beam and the received data associated with the location of the electromagnetic radiation beam; and
control the operation of the print head such that an extension segment is additively printed on the location of the workpiece interface.

2. The system of claim 1, wherein, when receiving data associated with reflections of the electromagnetic radiation beam, the computing system is configured to receive data indicative of a signal strength of the reflections of the electromagnetic radiation beam off of the build plate.

3. The system of claim 2, wherein, when determining the location of the workpiece interface, the computing system is further configured to:
generate an image of the build plate based on the received data associated with the reflections of the electromagnetic radiation beam and the received data associated with the location of the electromagnetic radiation beam, the image including a plurality of pixels, each pixel corresponding to one sample of the received data.

4. The system of claim 3, wherein, when determining the location of the workpiece interface, the computing system is further configured to:
analyze the image to determine the location of the workpiece interface.

5. The system of claim 1, wherein the additive manufacturing machine further includes a recoater, the computing system further configured to:
control an operation of the recoater such that a layer of powder is added to the build plate before the region of interest is scanned with the electromagnetic radiation beam.

6. The system of claim 1, wherein the region of interest corresponds to a portion of the build plate.

7. The system of claim 1, wherein the region of interest corresponds to an entirety of the build plate.

8. The system of claim 1, wherein, when controlling the operation of the print head such that the region of interest is scanned, the computing system is further configured to:
control the operation of a first print head of the additive manufacturing machine such that a first region of interest of the build plate is scanned with a first electromagnetic radiation beam; and
control the operation of a second print head of the additive manufacturing machine such that a second region of interest of the build plate is scanned with a second electromagnetic radiation beam.

9. The system of claim 1, wherein, when controlling the operation of the print head such that the region of interest is scanned, the computing system is further configured to control operation of a first print head and a second print head of the additive manufacturing machine such that the region of interest of the build plate is scanned with first and second electromagnetic radiation beams.

10. The system of claim 1, when controlling the operation of the print head such that the region of interest is scanned, the computing system is further configured to adjust at least one of a scan speed of a galvanometer of the additive manufacturing machine or a sampling rate of an imaging device of the additive manufacturing machine.

11. The system of claim 1, wherein an energy of the electromagnetic radiation beam is less when the region of interest of the build plate is scanned than when the extension segment is additively printed on the workpiece interface.

12. The system of claim 1, wherein the workpiece comprises a compressor blade or a turbine blade of a turbomachine.

13. The system of claim 1,
wherein the print head includes a beam emitter that emits the electromagnetic radiation beam and a focusing lens that focuses the electromagnetic radiation beam onto the build plate; and
the additive manufacturing machine further includes a detection module including an imaging device that receives the reflections of the electromagnetic radiation beam off the build plate.

14. The system of claim 13, wherein the computing system is further configured to generate an image of the region of interest based on the received data associated with the reflections of the electromagnetic radiation beam and the received data associated with the location of the electromagnetic radiation beam that illustrates differences in a signal strength of the reflections of the electromagnetic radiation beam.

15. The system of claim 14, wherein, when determining the location of the workpiece interface, the computing system is further configured to:
analyze the image of the region of interest to determine the location of the workpiece interface.

16. The system of claim 13, wherein, when controlling the operation of the print head such that the region of interest is scanned, the computing system is further configured to:
control the operation of a first print head of the additive manufacturing machine such that a first region of interest of the build plate is scanned with a first electromagnetic radiation beam; and
control the operation of a second print head of the additive manufacturing machine such that a second region of interest of the build plate is scanned with a second electromagnetic radiation beam.

17. The system of claim 13, wherein, when controlling the operation of the print head such that the region of interest is scanned, the computing system is further configured to control operation of a first print head and a second print head of the additive manufacturing machine such that the region of interest of the build plate is scanned with first and second electromagnetic radiation beams.

* * * * *